2,894,001

Patented July 7, 1959

2,894,001

2,4b-DIMETHYL - 1 - ACETALDEHYDO-2-(β,γ-DIHYDROXYISOBUTYL)-1,2,3,4,4a,4b,5,6,7,9,10,10a - DODECAHYDROPHENANTHRENE-4,7-DIONE AND METHODS OF PREPARING THE SAME

Lewis H. Sarett, Princeton, N.J., George I. Poos, Philadelphia, Pa., and William F. Johns, Morton Grove, Ill., assignors to Merck & Co., Inc., Rahway, N.J., a corporation of New Jersey No Drawing. Original application September 9, 1953, Serial No. 379,282, now Patent No. 2,837,516, dated June 3, 1958. Divided and this application March 4, 1957, Serial No. 643,887

2 Claims. (Cl. 260—340.9)

This application is a division of Serial No. 379,282, filed September 9, 1953, now Patent No. 2,837,516.

This invention relates to novel dodecahydrophenanthrene compounds, and processes of preparing the same. More particularly, it is concerned with a method of forming the 5 membered D ring of the steroid molecule from an appropriately substitutted dodecahydrophenanthrene compound, and with the new compounds so obtained. Specifically, it is concerned with a novel method of converting 2,4b-dimethyl-1-(β,hydroxyethyl)-2 - methallyl - 7 - ethylenedioxy - 1,2,3,4,4a,4b,5,6,7,8,10, 10a - dodecahydrophenanthrene - 4 - ol to 2,4b - dimethyl - 7 - ethylenedioxy - 2 - (β - ketopropyl) - 1-acetaldehydo - 1,2,3,4,4a,4b,5,6,7,8,10,10a-dodecahydrophenanthrene - 4 - one, and the process of converting this compound to Δ$^{5,16}$ - 3 - ethylenedioxy - pregnadiene-11,20-dione, and the valuable compounds so prepared.

The preparation of valuable steriod substances by total synthesis, involving formation of the four ring system, introduction of angular methyl groups, at positions 10 and 13, and placing of desired functional substituents in the ring system, presents a formidable challenge. In addition to these difficulties, the problem is further complicated by the stereochemistry of steroidal substances. Thus, saturated steroids, with a minimum of six asymmetric centers, are capable of existing in at least sixty-four stereochemical modifications. In spite of these difficulties, efforts have been made to prepare steroids by total synthesis in view of the importance and value of steroids such as cortisone, and the scarcity of raw materials suitable as starting materials for the preparation of these important products.

It is an object of the present invention to provide a method of preparing steroid compounds from dodecahydrophenanthrene compounds. Another object is to provide a process for the preparation of 11-keto progesterone from functionally substituted dodecahydrophenanthrene compounds.

An additional object is to provide novel dodecahydrophenanthrene compounds which are useful as intermediates in the synthesis of 11-keto progesterone.

Other objects will be apparent from the detailed description of this invention hereinafter provided.

In accordance with the present invention, it is now found that derivatives of 2,4b-dimethyl-1-(β-hydroxyethyl) - 2 - methallyl - 1,2,3,4,4a,4b,5,6,7,9,10,10a - dodecahydrophenanthrene - 4 - ol - 7 - one wherein the 7-keto substituent is blocked or protected by a substituent convertible to keto by hydrolysis, can be converted into Δ$^{4,16}$-3,11,20-triketo-pregnadiene by a novel sequence of chemical reactions shown in the following flow sheet:

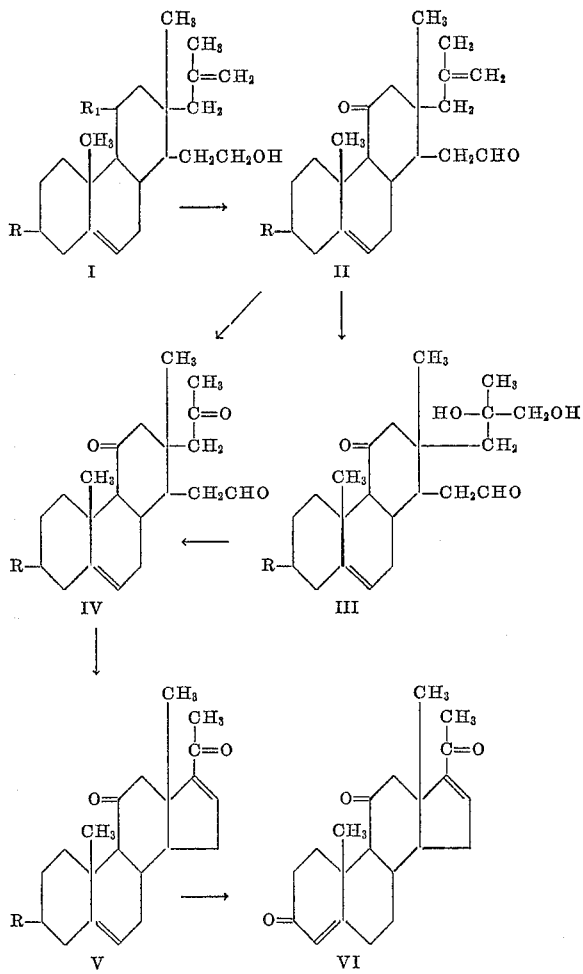

wherein R represents a substituent convertible to a keto group by acid hydrolysis, and R$_1$ represents a keto or a hydroxyl group.

In this sequence of reactions the starting material, Compound I, is first treated with an oxidizing agent to produce the 1-acetaldehydo-4-keto compound, Compound II. This compound is then reacted with osmium tetroxide and the resulting osmate ester hydrolyzed to convert the methallyl substituent at position 2 to a β,γ-dihydroxyisobutyl substituent, thereby producing Compound III. Upon reacting Compound III with periodic acid the β,γ-dihydroxyisobutyl substituent is converted to an β-ketopropyl group to produce Compound IV. The ring closure of Compound IV to form the five membered D ring of the steroid molecule is effected by reacting this compound with an alkali to produce Compound V. Upon hydrolyzing Compound V with acid, the ethylenedioxy group is cleaved forming a keto group at position 3 and causing the double bond to shift from the 5.6-position to the 4,5-position, thereby producing Compound VI.

Alternatively, as indicated in the flow sheet above, Compound IV can be prepared directly from Compound II. In this method Compound II is reacted with ozone and the resulting ozonide reduced to obtain Compound IV.

In the reactions described above, the keto group at C-7 of the dodecahydrophenanthrene nucleus is blocked or protected with a group convertible to keto by hydrolysis.

Thus, the 7-keto group can be blocked by enol ether, ketal, mercaptol, cyclic amine, cyclic ketal, cyclic mercaptol, cyclic hemithioketal groups and the like. Pursuant to a preferred embodiment of our invention, it is found that derivatives of 2,4b-dimethyl-1-(β-hydroxyethyl)-2-methallyl - 1,2,3,4,4a,4b5,6,7,9,10,10a - dodecahydrophenanthrene-4-ol-7-one or the corresponding 4,7-dione wherein the 7-keto substituent is replaced by a cyclic group of the formula

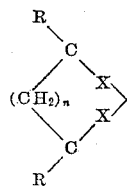

wherein R represents a hydrocarbon radical or hydrogen, X represents oxygen or sulfur, and $n$ represents the integer 0 or 1, are most suitable for use as starting materials in our process. Examples of such compounds having a cyclic ketal, mercaptol or hemithioketal group that might be mentioned are 2,4b-dimethyl-1-(β-hydroxyethyl) - 2 - methallyl - 7 - ethylenedioxy - 1,2,3,4,4a,4b,5,6,7,8,10,10a - dodecahydrophenanthrene - 4 - ol, 2,4b-dimethyl - 1 - (β - hydroxyethyl) - 2 - methallyl - 7 - ethylenemercaptol - 1,2,3,4,4a,4b,5,6,7,8,10,10a - dodecahydrophenanthrene - 4 - ol, and 2,4b - dimethyl - 1 - (β - hydroxyethyl) - 2 - methallyl - 7 - ethylenehemithioketal-1,2,3,4,4a,4b,5,6,7,8,10,10a - dodecahydrophenanthrene - 4-ol, or the corresponding 4,7-dione compounds. The 2,4b - dimethyl - 1 - (β - hydroxyethyl) - 2 - methallyl - 7 - ethylenedioxy - 1,2,3,4,4a,4b,5,6,7,8,10,10a - dodecahydrophenanthrene-4-ol can be prepared as described in the copending application of two of us, Serial No. 310,134, filed September 17, 1952, now Patent 2,786,064. The 2,4b - dimethyl - 1 - (β - hydroxyethyl) - 2 - methallyl - 7 - ethylenedioxy - 1,2,3,4,4a,4b,5,6,7,8,10,10a - dodecahydrophenanthrene-4-one can be prepared by subjecting 2,4b - dimethyl - 1 - (2 - tosyloxyethyl) - 2 - methallyl - 7 - ethylenedioxy - 1,2,3,4,4a,4b,5,6,7,8,10,10a - dodecahydrophenanthrene (prepared as described in copending application Serial No. 310,134, now Patent 2,786,064) to alkaline hydrolysis. The 2,4b-dimethyl-1-(β-hydroxyethyl) - 2 - methallyl - 7 - ethylenemercaptol - 1,2,3,4,4a,4b,5,6,7,8,10,10a - dodecahydrophenanthrene - 4 - ol and 2,4b - dimethyl - 1 - (β - hydroxyethyl) - 2 - methallyl - 7 - ethylenehemithioketal - 1,2,3,4a,4b,5,6,7,8,10,10a - dodecahydrophenanthrene-4-ol can be obtained by reacting 2,4b - dimethyl - 1 - (β - hydroxyethyl) - 2 - methallyl - 1,2,3,4,4a,4b,5,6,7,9,10,10a - dodecahydrophenanthrene - 4-ol-7-one (prepared as described in copending application Serial No. 310,134, now Patent 2,786,064) with ethanedithiol and β-mercaptoethanol respectively in the presence of fused zinc chloride and anhydrous sodium sulfate. Similarly, the corresponding 4-one compounds can be prepared utilizing the 4,7-dione as the starting material. Although, as indicated above, various substituents can be used to block or protect the 7-keto group, we have found that the cyclic ketal derivatives, and in particular the 7-ethylenedioxy derivative, are most conveniently utilized as the starting material in the processes of our invention.

The ethylenedioxy group of the intermediate products formed in our process, namely, Compounds II, III, and IV, is cleaved by hydrolysis with acid, for example by heating with perchloric acid, to produce the corresponding 7-keto compounds. In this hydrolysis, the double bond at the 8a:9 position is shifted to the 8:8a position, thus forming an α,β-unsaturated ketone.

For the purpose of providing a better understanding of this invention, our processes can be exemplified by the application to a specific starting material, the ethylenedioxy derivative of 2,4b-dimethyl-2-methallyl-1-(β-hydroxyethyl) - 1,2,3,4,4a,4b,5,6,7,9,10,10a - dodecahydrophenanthrene-4-ol-7-one.

In the first step of our process, this starting material, 2,4b - dimethyl - 7 - ethylenedioxy - 2 - methallyl - 1 - (β - hydroxyethyl) - 1,2,3,4,4a,4b,5,6,7,8,10,10a - dodecahydrophenanthrene-4-ol is reacted with an oxidizing agent to convert the 4-hydroxy substituent to a keto group and to convert the β-hydroxyethyl to the acetaldehydo substituent. We have found that this oxidation is most conveniently accomplished by reacting a solution of the starting material in an organic base with a complex formed by reacting an organic base with chromium trioxide, for example the pyridine-chromium trioxide complex. This method of oxidizing primary and secondary alcohols to the corresponding carbonyl compounds is described in the copending application of one of us, Serial No. 292,985, filed June 11, 1952. Thus, this oxidation is readily effected by intimately contacting a solution of the starting compound in pyridine with the complex formed by reacting chromium trioxide with pyridine and allowing the reaction mixture to stand at room temperature for sufficient time to complete the oxidation. The 2,4b-dimethyl-7 - ethylenedioxy - 2 - methallyl - 1 - acetaldehydo - 1,2,3,4,4a,4b,5,6,7,8,10,10a - dodecahydrophenanthrene - 4 - one is recovered by diluting the reaction mixture with water, extracting the aqueous solution with a water immiscible solvent for the product, such as ethyl ether, chromatographing the resulting ether solution over acid-washed alumina, and eluting the product with a mixture of petroleum ether and ethyl ether.

Although the principal product of the oxidation reaction is 2,4b-dimethyl-7-ethylenedioxy-2-methallyl-1-acetaldehydo - 1,2,3,4,4a,4b,5,6,7,8,10,10a - dodecahydrophenanthrene-4-one, small amounts of other oxidation products such as 2,4b-dimethyl-7-ethylenedioxy-2-methallyl-1-(β - hydroxyethyl) - 1,2,3,4,4a,4b,5,6,7,8,10,10a - dodecahydrophenanthrene-4-one and the corresponding 1-(carboxymethyl) compound are also obtained. These products can be reduced by reaction with lithium aluminum hydride to produce an epimeric form of the starting material. This epimeric form of the starting material can be used in the present process as effectively as the original starting compound, thereby increasing the final yield of product.

In the next steps of our process, the 2-methallyl substituent of 2,4b-dimethyl-7-ethylenedioxy-2-methallyl-1-acetaldehydo - 1,2,3,4,4a,4b,5,6,7,8,10,10a - dodecahydrophenanthrene-4-one is converted to a β-ketopropyl group. As indicated on the flow sheet shown above, this can be accomplished by either direct oxidation, or by cleavage of the intermediate glycol (Compound III).

In carrying out this conversion by the direct oxidation, the 2,4b-dimethyl-7-ethylenedioxy-2-methallyl-1-acetaldehydo - 1,2,3,4,4a,4b,5,6,7,8,10,10a - dodecahydrophenanthrene-4-one is dissolved in a suitable solvent, such as a lower aliphatic alcohol, the solution cooled to a low temperature of about −80° C., and ozonized oxygen containing one equivalent of ozone based on the dodecahydrophenanthrene is passed through the solution. The resulting reaction mixture is warmed to about 0° C. and the ozonide decomposed in accordance with methods known in the art, as for example, by reduction with a small amount of zinc and aqueous acetic acid. After decomposition of the ozonide, the product 2,4b-dimethyl-7 - ethylenedioxy - 2 - (β - ketopropyl) - 1 - acetaldehydo-1,2,3,4,4a,4b,5,6,7,8,10,10a - dodecahydrophenanthrene-4-one is readily recovered by concentrating the reaction mixture under diminished pressure, extracting the concentrate with ether, chromatographing the concentrate over acid washed alumina, eluting with a mixture of petroleum ether-ethyl ether, and evaporating the resulting eluate.

Alternatively, and in accordance with a preferred embodiment of our invention, the β-ketopropyl compound is obtained by a two step process involving treating the methallyl compound with osmium tetroxide and decomposing the resulting osmate ester to produce the corresponding 2-(β,γ-dihydroxyisobutyl) compound, and cleaving this latter product by treatment with periodic acid. In this procedure, the 2,4b - dimethyl - 7 - ethylenedioxy-2 - methallyl - 1 - acetaldehydo - 1,2,3,4,4a,4b,5,6,7,8,10,10a-dodecahydrophenanthrene-4-one is reacted with osmium tetroxide to form the corresponding osmate ester, the reaction being preferably effected in a suitable inert solvent medium such as benzene, ethyl ether, tetrahydrofuran, and the like, or in a mixture of such solvents. The reaction is completed by allowing the reaction mixture to stand at room temperature for about one hour. The osmate ester is then decomposed by adding ethanol and treating the resulting solution with an aqueous solution of sodium sulfite. The glycol formed in this reaction mixture can be recovered by filtering the resulting reaction mixture, concentrating this solution under diminished pressure, extracting this concentrate with chloroform, and evaporating the chloroform extract.

The 2,4b - dimethyl - 7 ethylenedioxy - 2 - (β,γ - dihydroxyisobutyl) - 1 - acetaldehydo - 1,2,3,4,4a,4b,5,6, 7,8,10,10a-dodecahydrophenanthrene-4-one is then conveniently converted to the corresponding 2-(β-ketopropyl) compound by reacting a solution of this product in a mixture of tetrahydrofuran and pyridine with a solution of periodic acid and allowing the resulting reaction mixture to stand at about room temperature for about one-half hour. At this point, the mixture is diluted with water and the tetrahydrofuran removed by concentration under diminished pressure. The resulting concentrate is then extracted with benzene and the 2,4b-dimethyl-7-ethylenedioxy - 2 - (β -ketopropyl) - 1 - acetaldehydo) - 1,2, 3,4,4a,4b,5,6,7,8,10,10a - dodecahydrophenanthrene - 4-one obtained by concentration of the benzene extracts.

The 2-(β-ketopropyl) compound is then reacted with an alkaline reagent to effect ring closure and form the corresponding steroid compound. Thus, on heating a suspension of 2,4b-dimethyl-7-ethylenedioxy-2-(β-ketopropyl) - 1 - acetaldehydo - 1,2,3,4,4a,4b,5,6,7,8,10,10a-dodecahydrophenanthrene-4-one in an aqueous solution of potassium hydroxide at about 100° C. for nineteen hours Δ$^{5,16}$-3 - ethylenedioxy - pregnadiene - 11,20 - dione is formed. This product is readily recovered from the resulting alkaline solution by extraction with a suitable water immiscible solvent for the product such as chloroform, and concentration of the resulting solvent extracts.

The 3-ethylenedioxy compound so obtained is hydrolyzed by heating with acids to produce Δ$^{4,16}$-pregnadiene-3,11,20-trione.

The derivatives of Δ$^{4,16}$ - pregnadiene - 3,11,20 - trione, wherein the 3-keto group is protected by a group convertible to keto by hydrolysis with acid, obtained in accordance with the present invention are valuable compounds useful as intermediates in the synthesis of cortisone. Thus, for example, dl-Δ$^{5,16}$-3-ethylenedioxy-pregnadiene-11,20-dione can be selectively hydrogenated by reaction with hydrogen in the presence of Raney nickel catalyst to produce dl-Δ$^5$-3-ethylenedioxy-pregnene-11,20-dione by the method shown Berichte 72, 182 for reducing Δ$^{5,16}$-3-hydroxy-20-keto pregnadiene to Δ$^5$-3-hydroxy-20-keto-pregnene. The dl-Δ$^5$-3-ethylenedioxy-pregnene-11,20-dione can then be converted to cortisone by the methods described in the Journal of the American Chemical Society 74, 4974 (1952).

The 2,4b - dimethyl - 1 - (β - hydroxyethyl) - 2 - methallyl - 7 - ethylenedioxy - 1,2,3,4,4a,4b,5,6,7,8,10,10a-dodecahydrophenanthrene-4-ol used as the starting material in the examples illustrating the processes of this invention, can be prepared as described in copending application, Serial No. 310,134, filed September 17, 1952, now Patent 2,786,064.

EXAMPLE 1

*2,4b - dimethyl - 7 - ethylenedioxy - 2 - methallyl - 1 - acetaldehydo - 1,2,3,4,4a,4b,5,6,7,8,10,10a - dodecahydrophenanthrene-4-one*

To the complex from 380 mg. of chromium trioxide dissolved in 3.5 cc. of pyridine was added 384 mg. of 2,4b - dimethyl - 7 - ethylenedioxy - 2 - methallyl - 1 - (β-hydroxyethyl) - 1,2,3,4,4a,4b,5,6,7,8,10,10a - dodecahydrophenanthrene-4-ol in 3 cc. of pyridine. After standing overnight at room temperature the reaction mixture was diluted with water and extracted with ether. The combined ether extracts were washed with water, dried and concentrated. The resulting crude crystalline product was chromatographed on 12 g. of acid-washed alumina. With petroleum ether-ether there was eluted first 2,4b-dimethyl - 7 - ethylenedioxy - 2 - methallyl - 1 - acetaldehydo - 1,2,3,4,4a,4b,5,6,7,8,10,10a - dodecahydrophenanthrene-4-one melting at 148–150° C. after recrystallization from ether followed by 2,4b-dimethyl-7-ethylenedioxy - 2 - methallyl - 1 - (β - hydroxyethyl) - 1,2,3,4,4a, 4b,5,6,7,8,10,10a - dodecahydrophenanthrene - 4 - one, M.P. 182–6° C. from ether. Further elution with methanol gave 2,4b-dimethyl-7-ethylenedioxy-2-methallyl-1-carboxymethyl - 1,2,3,4,4a,4b,5,6,7,8,10,10a - dodecahydrophenanthrene-4-one melting at 215–216° C. after purification by recrystallization from ethyl acetate.

The above 1-(β-hydroxyethyl) compound and the 1-(carboxymethyl) compound may be reduced with lithium aluminum hydride in tetrahydrofuran to produce the C–11 epimer of 2,4b-dimethyl-7-ethylenedioxy-2-methallyl - 1 - (β - hydroxyethyl) - 1,2,3,4,4a,4b,5,6,7,8, 10,10a-dodecahydrophenanthrene-4-ol, the original starting material.

The 2,4b-dimethyl-7 - ethylenedioxy-2-methallyl-1-acetaldehydo - 1,2,3,4,4a,4b,5,6,7,8,10,10a - dodecahydrophenanthrene-4-one on acid hydrolysis yields 2,4b-dimethyl - 2 - methallyl - 1 - acetaldehydro - 1,2,3,4,4a,-4b,5,6,7,8,10,10a-dodecahydrophenanthrene-4,7-dione.

Similarly, on acid hydrolysis 2,4b-dimethyl-7-ethylenedioxy - 2 - methallyl - 1 - (β-hydroxyethyl)-1,2,3,4,4a,4b,-5,6,7,8,10,10a-dodecahydrophenanthrene-4-one and 2,4b-dimethyl - 7 - ethylenedioxy - 2 - methallyl - 1 - carboxymethyl - 1,2,3,4,4a,4b,5,6,7,8,10,10a-dodecahydrophenanthrene-4-one yields 2,4b - dimethyl - 2 - methallyl - 1-(β - hydroxyethyl) - 1,2,3,4,4a,4b,5,6,7,9,10,10a - dodecahydrophenanthrene - 4,7 - dione and 2,4b - dimethyl - 2-methallyl - 1 - carboxymethyl-1,2,3,4,4a,4b,5,6,7,9,10,10a-dodecahydrophenanthrene-4,7-dione respectively.

EXAMPLE 2

*2,4b - dimethyl - 7 - ethylenedioxy - 2 - methallyl - 1 - carboxymethyl - 1,2,3,4,4a,4b,5,6,7,8,10,10a - dodecahydrophenanthrene-4-one*

In another experiment carried out as described in Example 1 the combined ether extracts were extracted with aqueous sodium hydroxide solution at this point to remove the carboxymethyl compound before chromatographing the mixture. The sodium hydroxide extract was then acidified with aqueous sodium dihydrogen phosphate solution whereupon crystalline 2,4b-dimethyl-7-ethylenedioxy - 2 - methallyl - 1 - carboxymethyl - 1,2,3,4,4a,4b,-5,6,7,8,10,10a - dodecahydrophenanthrene - 4 - one separated from the solution.

Chromatography of the ether extracts was then carried out as described in Example 1 with the exception that the methanol elution was omitted.

EXAMPLE 3

*2,4b - dimethyl - 7 - ethylenedioxy - 2 - (β - γ - dihydroxyisobutyl) - 1 - acetaldehydo - 1,2,3,4,4a,4b,5,6,7,8,10,-10a - dodecahydrophenanthrene-4-one*

To a solution of 145 mg. of 2,4b-dimethyl-7-ethylenedioxy - 2 - methallyl - 1 - acetaldehydo - 1,2,3,4,4a,4b,5,6,-

7,8,10,10a-dodecahydrophenanthrene-4-one in 1.5 cc. of benzene and 0.5 cc. of tetrahydrofuran was added 110 mg. of osmium tetroxide. After one hour at room temperature the precipitated osmate ester was dissolved in 6.5 cc. of ethanol and treated with a solution of 700 mg. of sodium sulfite in 4 cc. of water. The mixture was agitated thoroughly for twenty minutes to effect hydrolysis of the osmate ester. After standing briefly the upper layer was decanted and the lower layer was washed repeatedly by decantation with ethanol. The organic solutions were combined and concentrated to a small volume. Extraction with chloroform followed by washing with water, drying and concentration yielded crystalline 2,4b-dimethyl - 7 - ethylenedioxy - 2 - ($\beta$ - $\gamma$ - dihydroxyisobutyl) - 1 - acetaldehydo - 1,2,3,4,4a,4b,5,6,7,8,10,10a-dodecahydrophenanthrene - 4 - one, melting at 174–177° C. after purification by recrystallization from benzene.

Upon hydrolysis with acid, 2,4b-dimethyl-7-ethylenedioxy - 2 - ($\beta,\gamma$ - dihydroxyisobutyl) - 1 - acetaldehydo-1,2,3,4,4a,4b,5,6,7,8,10,10a - dodecahydrophenanthrene-4-one is converted to 2,4b-dimethyl-2-($\beta,\gamma$-dihydroxyisobutyl) - 1 - acetaldehydro - 1,2,3,4,4a,4b,5,6,7,9,10,-10a-dodecahydrophenanthrene-4,7,-dione.

EXAMPLE 4

2,4b - dimethyl - 7 - ethylenedioxy - 2 - ($\beta$ - ketopropyl)- 1 - acetaldehydo - 1,2,3,4,,4a,4b,5,6,7,8,10,10a - dodecahydrophenanthrene-4-one To 200 mg. of 2,4b-dimethyl-7-ethylenedioxy-2-($\beta,\gamma$-dihydroxyisobutyl) - 1 - acetaldehydo - 1,2,3,4,4a,4b,5,6,7,-8,10,10a-dodecahydrophenanthrene-4-one in 1.5 cc. of tetrahydrofuran and 0.5 cc. of pyridine was added a solution of 152 mg. of periodic acid in 1 cc. of water. The reaction mixture was allowed to stand at room temperature thirty minutes and then was diluted with water. Tetrahydrofuran was removed under vacuum and the product was extracted with benzene. The benzene extract was washed with water, dried and concentrated to give crystalline 2,4b-dimethyl-7-ethylenedioxy-2-($\gamma$-ketopropyl) - 1 - acetaldehydo - 1,2,3,4,4a,4b,5,6,7,8,10,10a-dodecahydrophenanthrene-4-one. The pure material melted at 131–133° C. after being recrystallized from ether.

Upon hydrolysis with acid, 2,4b-dimethyl-7-ethylenedioxy - 2 - ($\beta$ - ketopropyl) - 1 - acetaldehydo - 1,2,3,4,4a,4b,5,6,7,8,10,10a-dodecahydrophenanthrene - 4 - one is converted to 2,4b - dimethyl - 2 - ($\beta$ - keto - propyl) - 1-acetaldehydo - 1,2,3,4,4a,4b,5,6,7,9,10,10a - dodecahydrophenanthrene-4,7-dione.

EXAMPLE 5 dl-$\Delta^{5,16}$-3-ethylenedioxy-pregnadiene-11,20-dione

Forty-three milligrams of 2,4b-dimethyl-7-ethylenedioxy - 2 - $\beta$ - ketopropyl - 1 - acetaldehydo - 1,2,3,4,4a, 4b,5,6,7,8,10,10a - dodecahydrophenanthrene - 4 - one was suspended in 10 cc. of 2.5% potassium hydroxide solution. The reaction mixture was sealed from the atmosphere under slight vacuum and heated on the steam cone for nineteen hours. After cooling the reaction mixture was extracted with chloroform and the extract was dried and concentrated. The residue was recrystallized from ether giving dl-$\Delta^{5,16}$-3-ethylenedioxy-pregnadiene-11,20-dione melting at 193–197° C.

When $\Delta^{5,16}$ - 3 - ethylenedioxy-pregnadiene-11,20 - dione is hydrolyzed by treatment with acid, $\Delta^{4,16}$-pregnadiene-3,11,20-trione is obtained.

Various changes and modifications in the procedure herein disclosed will occur to those skilled in the art, and to the extent that such changes and modifications are embraced by the appended claims, it is to be understood that they constitute part of our invention.

What is claimed is:

1. 2,4b - dimethyl - 1 - acetaldehydo - 2 - ($\beta,\gamma$ - dihydroxyisobutyl) - 7 - ethylenedioxy - 1,2,3,4,4a,4b,5,-6,7,8,10,10a-dodecahydrophenanthrene-4-one.

2. 2,4b - dimethyl - 1 - acetaldehydo - 2 - ($\beta,\gamma$ - dihydroxyisobutyl) - 1,2,3,4,4a,4b,5,6,7,9,10,10a - dodecahydrophenanthrene-4,7-dione.

No references cited.